US010699457B2

(12) United States Patent
Mohan et al.

(10) Patent No.: US 10,699,457 B2
(45) Date of Patent: Jun. 30, 2020

(54) VEHICLE DISPLAY WITH AUGMENTED REALTY

(71) Applicant: Ford Global Technologies, LLC, Dearborn, MI (US)

(72) Inventors: Shankar Mohan, Ann Arbor, MI (US); Steven Joseph Szwabowski, Northville, MI (US); John Ottavio Michelini, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/920,845

(22) Filed: Mar. 14, 2018

(65) Prior Publication Data

US 2019/0287282 A1 Sep. 19, 2019

(51) Int. Cl.
G06T 11/60 (2006.01)
G06K 9/00 (2006.01)
B60R 1/12 (2006.01)

(52) U.S. Cl.
CPC .............. *G06T 11/60* (2013.01); *B60R 1/12* (2013.01); *G06K 9/00805* (2013.01); *B60R 2001/1215* (2013.01); *B60R 2001/1223* (2013.01); *B60R 2300/301* (2013.01); *B60R 2300/60* (2013.01); *B60R 2300/8093* (2013.01)

(58) Field of Classification Search
CPC ... G06T 11/60; B60R 1/12; B60R 2001/1215; B60R 2001/1223; B60R 2300/301; B60R 2300/60; B60R 2300/8093; G06K 9/00805
See application file for complete search history.

(56) References Cited

U.S. PATENT DOCUMENTS

| 6,198,409 | B1* | 3/2001 | Schofield | B60R 1/12 |
| | | | | 280/728.1 |
| 7,432,800 | B2 | 10/2008 | Harter, Jr. et al. | |
| 8,405,491 | B2 | 3/2013 | Fong et al. | |
| 9,656,606 | B1* | 5/2017 | Vose | B60Q 9/008 |
| 9,884,585 | B1* | 2/2018 | Lubbers | B60Q 1/525 |
| 2011/0181728 | A1* | 7/2011 | Tieman | B60R 1/00 |
| | | | | 348/148 |
| 2014/0019005 | A1* | 1/2014 | Lee | G08G 1/166 |
| | | | | 701/36 |
| 2015/0154802 | A1 | 6/2015 | Song | |

(Continued)

FOREIGN PATENT DOCUMENTS

DE 102009015913 A1 9/2010

OTHER PUBLICATIONS

"Lane change assist", Bosch Mobility Solutions, https://www.bosch-mobility-solutions.com/en/products-and-services/passenger-cars-and-light-commercial-vehicles/driver-assistance-systems/lane-change-assist/, © Robert Bosch GmbH.

(Continued)

*Primary Examiner* — Yu Chen
(74) *Attorney, Agent, or Firm* — Frank A. MacKenzie; Bejin Bieneman PLC

(57) ABSTRACT

An object exterior to a vehicle can be detected, and an augmented image of the detected object can be output to a vehicle display device, wherein at least one of dimensions and a motion of the augmented image is adjusted based on an environmental condition and physical attribute of the detected object including at least one of a speed, an acceleration, a location, and a direction of the detected object.

11 Claims, 8 Drawing Sheets

(56) References Cited

U.S. PATENT DOCUMENTS

| | | | |
|---|---|---|---|
| 2016/0035222 A1* | 2/2016 | Mikuni | G08G 1/0962 |
| | | | 701/117 |
| 2016/0046237 A1* | 2/2016 | Sugimoto | B60R 1/00 |
| | | | 348/148 |
| 2016/0059783 A1* | 3/2016 | Sisbot | B60R 1/001 |
| | | | 340/901 |
| 2017/0088053 A1 | 3/2017 | Orellana et al. | |
| 2017/0213273 A1* | 7/2017 | Dietrich | G06Q 30/0631 |
| 2018/0004211 A1* | 1/2018 | Grimm | G01C 21/3407 |
| 2018/0151066 A1* | 5/2018 | Oba | G08G 1/096725 |
| 2018/0208195 A1* | 7/2018 | Hutcheson | G08G 1/162 |
| 2019/0185018 A1* | 6/2019 | Tao | B60W 50/14 |

OTHER PUBLICATIONS

"Nissan technology leadership continues with introduction of Intelligent Rear View Mirror on 2018 Armada SUV", Nissan, Aug. 30, 2017.

* cited by examiner

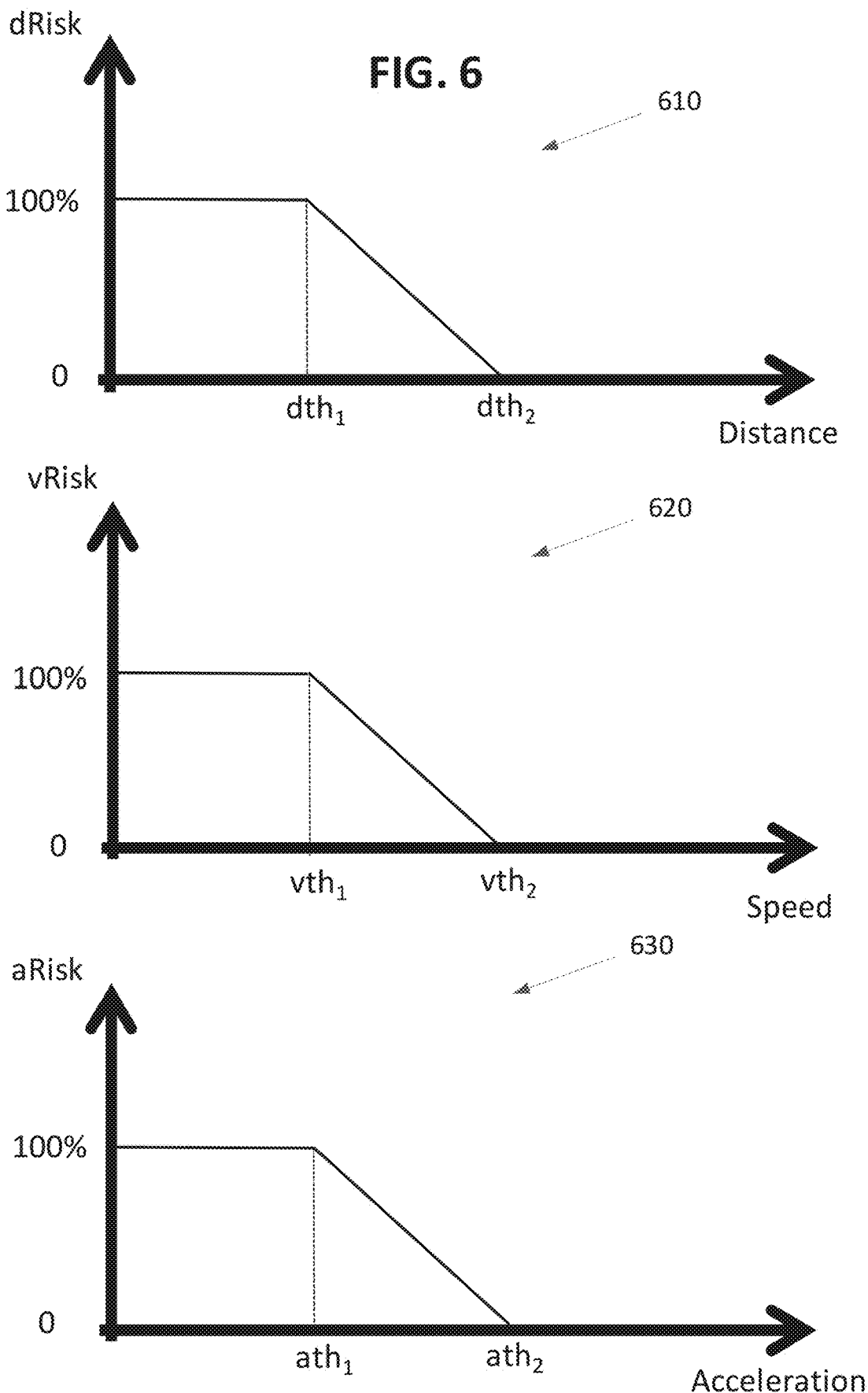

VEHICLE DISPLAY WITH AUGMENTED REALTY

BACKGROUND

When a vehicle changes its driving lane, there is often a risk of a collision with an object, e.g., another vehicle. A driver of the vehicle may initiate a lane change without recognizing or attempting to mitigate a collision risk, e.g., another vehicle is in a blind spot of the driver. Unfortunately, vehicles lack ways to effectively and/or efficiently attract driver's attention to a collision risk which may be caused by a vehicle lane change.

BRIEF DESCRIPTION OF THE DRAWINGS

FIG. 6 shows exemplary graphs for risks relative to speed, acceleration and distance.

DETAILED DESCRIPTION

Introduction

Figure 1:
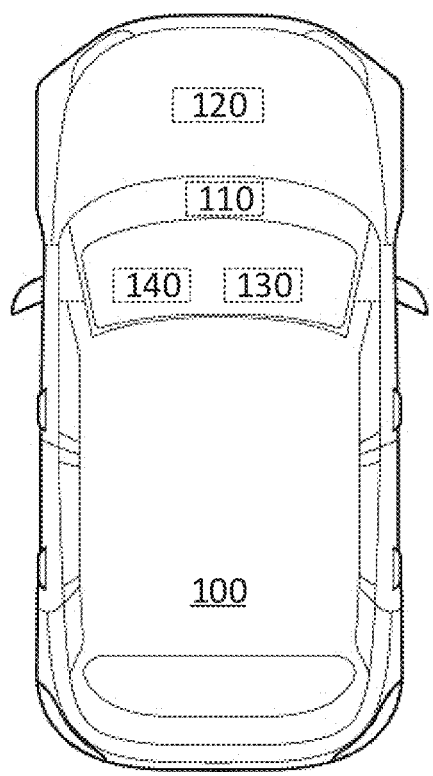
FIG. 1 is a block diagram of an example host vehicle.

Disclosed herein is a method including detecting an object exterior to a vehicle, and outputting an augmented image of the detected object to a vehicle display device. At least one of dimensions and a motion of the augmented image is adjusted based on an environmental condition and physical attribute of the detected object including at least one of a speed, an acceleration, a location, and a direction of the detected object.

The environmental condition may include at least one of traffic density, a road type, and a visibility.

The display device may include a vehicle mirror, and the method further include projecting the augmented image on the vehicle mirror, wherein the augmented image is superimposed on a reflected image of the detected object in the mirror.

The method may further include determining a risk posed by the detected object and adjusting the dimensions of the detected object in the augmented image based at least on the determined risk.

The method may further include determining the risk based on the physical attribute of the detected object and a risk classifier.

The method may further include determining a multiplier factor based on the environmental condition, determining a compensated risk based on the determined multiplier factor and the determined risk, and adjusting the dimensions of the image of the detected object based on the compensated risk.

The method may further include determining a risk posed by the detected object and adjusting the motion of the image of the detected object by blinking the image at a frequency, wherein the frequency is based on the determined risk.

Further disclosed herein is a system including a processor and a memory. The memory stores instructions executable by the processor to detect an object exterior to a vehicle, and output an augmented image of the detected object to a vehicle display device, wherein at least one of dimensions and a motion of the augmented image is adjusted based on an environmental condition and physical attribute of the detected object including at least one of a speed, an acceleration, a location, and a direction of the detected object.

The environmental condition may include at least one of traffic density, a road type, and a visibility.

The display device may include a vehicle mirror, and the instructions include further instructions to project the augmented image on the vehicle mirror, wherein the augmented image is superimposed on a reflected image of the detected object in the mirror.

The instructions may include further instructions to determine a risk posed by the detected object and adjusting the dimensions of the detected object in the augmented image based at least on the determined risk.

The instructions may include further instructions to determine the risk based on the physical attribute of the detected object and a risk classifier.

The instructions may include further instructions to determine a multiplier factor based on the environmental condition, determine a compensated risk based on the determined multiplier factor and the determined risk, and adjust the dimensions of the image of the detected object based on the compensated risk.

The instructions may include further instructions to determine a risk posed by the detected object and to adjust the motion of the image of the detected object by blinking the image at a frequency, wherein the frequency is based on the determined risk.

Further disclosed herein is a system including means for detecting an object exterior to a vehicle, and means for outputting an augmented image of the detected object to a vehicle display device, wherein at least one of dimensions and a motion of the augmented image is adjusted based on an environmental condition and physical attribute of the detected object including at least one of a speed, an acceleration, a location, and a direction of the detected object.

Further disclosed is a computing device programmed to execute any of the above method steps.

Yet further disclosed is a computer program product, comprising a computer readable medium storing instructions executable by a computer processor, to execute any of the above method steps.

System Elements

A vehicle computer may be programmed to detect an object exterior to a vehicle such a second vehicle, a motorcycle, etc. The computer may output an augmented image of the detected object to a vehicle display device. The dimensions and/or motion of the displayed object may be adjusted based on an environmental condition and/or physical attribute of the detected object such as a speed, an acceleration, a location, and a direction of the detected object. Thus, advantageously, the augmented image can attract a vehicle driver's attention and can inform the vehicle driver about a collision risk posed by an object. Additionally or alternatively, when a vehicle is operated in an autonomous mode, a vehicle occupant can be informed about how a vehicle computer detects risk(s) posed by object(s). This can prevent or help prevent the vehicle occupant from interfering with autonomous operations because the occupant viewing the augmented image is assured that the vehicle computer has detected risk(s) posed by other objects.

FIG. 1 illustrates a vehicle 100. The vehicle 100 may be powered in a variety of ways, e.g., with an electric motor and/or internal combustion engine. The vehicle 100 may be a land vehicle such as a car, truck, etc. A vehicle 100 may include a computer 110, actuator(s) 120, sensor(s) 130, a human machine interface (HMI) 140, and a reference point 150. In one example, a reference point 150 of a vehicle 100 and/or any object 200a, 200b, 200c (see FIG. 2) may be a geometrical center of the vehicle 100 and/or object 200.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode, an operator controls the vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. For example, the sensors 130 may include one or more camera, radar, infrared, and/or LIDAR sensors 130 disposed in the vehicle 100 and/or on the vehicle 100 providing data encompassing at least some of the vehicle 100 exterior. The data may be received by the computer 110 through a suitable interface such as a vehicle network, communication bus, etc. A LIDAR sensor 130 attached to a vehicle 100 exterior, e.g., on a roof, pillar, etc., of the vehicle 100, may provide object data by which the computer 110 can make determinations including relative locations, sizes, and shapes of objects 200a, 200b, 200c (see FIG. 2) such as other vehicles surrounding the vehicle 100. The computer 110 may be programmed to detect objects 200a, 200b, 200c using various techniques, e.g., auto regressive models, stochastic models, AI (artificial intelligence)-based models, etc. A vehicle 100 computer 110 may receive the object data and operate the vehicle in an autonomous and/or semi-autonomous mode based at least in part on the received object data.

The HMI 140 may be configured to receive user input, e.g., during operation of the vehicle 100. For example, a user may select a mode of operation, e.g., an autonomous mode, by inputting a requested mode of operation via the HMI 140. Moreover, the HMI 140 may be configured to present information to the user. Thus, the HMI 140 may be located in a passenger compartment of the vehicle 100.

The HMI 140 may include a display screen that is configured to output a "hybrid" image. An image is a digital image including a plurality of pixels (or points) and data related to each of the pixels, e.g., color, intensity, etc. A hybrid image, in the present context, is an image that may include a combination of "captured" and "generated" images. A "captured" image is captured by a camera or other optical sensor such as a vehicle 100 camera, etc. A "generated" image includes data generated from stored information, e.g., lines, shades, geometrical shapes such as triangle, etc., and/or objects shapes such as vehicle shape, motor cycle shape, etc. An image may be a "hybrid" image, i.e., may include both captured image data and generated image data. Including a generated image in a hybrid image is herein referred to as "augmented realty". An "augmented realty" is a view of a real-world environment in which generated images are "augmented" (or placed) by computer-generated information e.g., including visual, auditory, haptic, etc. The superimposed "generated" image can be additive to a natural environment, e.g., shapes such as a triangle, circles, shades, etc. (see FIG. 3A) or may include an adjustment of real world images, e.g., modifying dimensions of an object (see FIG. 3B), such that it is perceived as an immersive aspect of the real environment. Thus, augmented realty may alter a vehicle 100 occupant's perception of a real world environment.

In addition, the computer 110 may be programmed to communicate through a wireless communication network with, e.g., a remote computer. The wireless communication network, which may include a Vehicle-to-Vehicle (V-to-V) and/or a Vehicle-to-Infrastructure (V-to-I) communication network, includes one or more structures by which the vehicles 100, the remote computer, etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), and/or wide area networks (WAN), including the Internet, providing data communication services.

Figure 2:
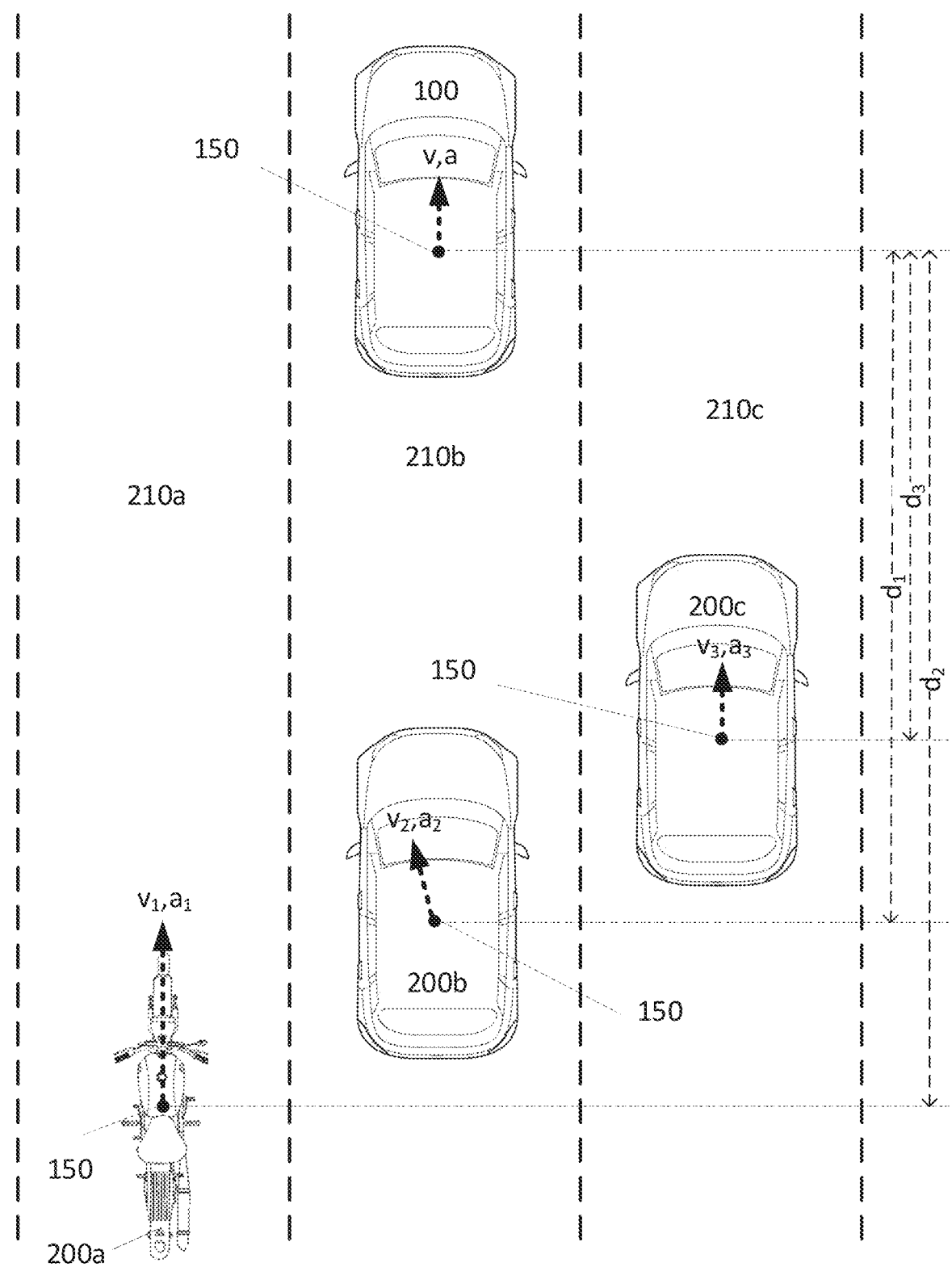
FIG. 2 is a diagram showing an example of multiple vehicles driving in multiple lanes.
Figure 3A:
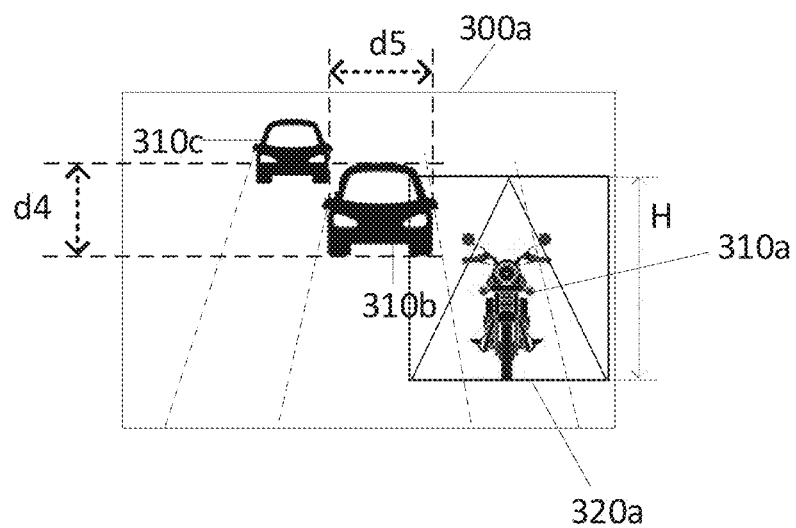
FIG. 3A shows a hybrid image including objects behind the host vehicle and generated augmented realty embedded in the image.
Figure 3B:
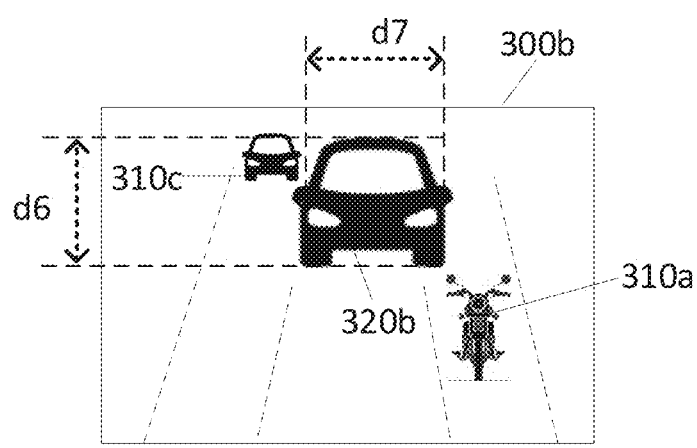
FIG. 3B shows a hybrid image including objects behind the host vehicle with adjusted dimensions.

With reference to FIGS. 2, 3A, and 3B, the computer 110 can be programmed to detect an object 200a, 200b, 200c exterior to a vehicle 100, to output an augmented image 320a, 320b of the detected object 200a, 200b, 200c to a vehicle 100 display device, e.g., the HMI 140. At least one of dimensions and a motion of the augmented image 320a, 320b is adjusted based on an environmental condition and physical attribute of the detected object 200a, 200b, 200c including a speed, an acceleration, a location, and/or a direction of the detected object. Additionally or alternatively, the dimensions and/or the motion of the augmented image 320a, 320b may be adjusted based on a time to collision (TTC) of the vehicle 100 and the respective object 200a, 200b, 200c. The TTC is a predicted duration of time until collision of the vehicle 100 and an object 200a, 200b, 200c. The computer 110 may be programmed to determine the TTC for each of the objects 200a, 200b, 200c based on (i) the vehicle 100 speed and the direction of movement, and (ii) a speed and direction of movement of each of the objects 200a, 200b, 200c. In one example, the computer 110 may be programmed to blink an augmented image 320a, 320b upon determining that a TTC associated with a respective object 200a, 200b, 200c is less than a predetermined threshold, e.g., 3 seconds.

In the present context, an "environmental condition" means a measurement of a phenomenon outside and within proximity to the vehicle, e.g., a traffic density, a road type, and a visibility, as discussed below with reference to Tables 1-3. The "physical attributes" of an object 200a, 200b, 200c and/or the vehicle 100 include a speed, a location, an acceleration, and/or a direction of movement, etc.

As discussed above, an augmented image is a generated image which can be displayed in the HMI 140. Thus, the dimensions and/or the motion of the augmented image, in the present context, refers to the augmented image displayed on the vehicle 100 HMI 140, as discussed with reference to FIGS. 3A-3B. A motion of the augmented image is a movement of the augmented image as displayed via the HMI 140 relative to a captured image, e.g., a real world view of the vehicle 100 camera and/or mirror, being shown by the HMI 140. Dimensions of the augmented image may be defined in units of pixels, centimeters, etc. The dimensions of the augmented image may include a height, depth, width, etc. Additionally or alternatively, change of dimensions and/or motion of the augmented image may refer to an augmented image projected on a HMI 140, e.g., a mirror, as discussed with reference to FIG. 5.

FIG. 2 illustrates the vehicle 100 and multiple objects 200a, 200b, 200c in a multi-lane road, e.g., having lanes 210a, 210b, 210c. The objects 200a, 200b, 200c may include land vehicles such as cars, motorcycles, bicycles, trucks, etc. Any number of objects 200a, 200b, 200c may be in each of the lanes 210a, 210b, 210c. The example of FIG. 2 shows lanes 210a, 210b, 210c in one direction. FIG. 2 shows the objects 200a, 200b, 200c behind the vehicle 100 in a same direction. Additionally or alternatively, the objects 200a, 200b, 200c may be in front of the vehicle 100 and/or drive in an opposite direction relative to a vehicle 100 direction of movement. The road may be bi-directional, i.e., one or more of the objects 200a, 200b, 200c may move in an opposite direction relative to the vehicle 100.

FIG. 2 shows longitudinal distances $d_1$, $d_2$, $d_3$ of the vehicle 100 to the objects 200a, 200b, 200c. A longitudinal distance in the present context is a distance along a longitudinal direction of a lane between a vehicle 100 reference point 150 and an object 200a, 200b, 200c reference point 150. The computer 110 may be programmed to determine the physical attributes of the objects 200a, 200b, 200c such as the distances $d_1$, $d_2$, $d_3$ based on data received from vehicle 100 sensors 130. Additionally or alternatively, the computer 110 may be programmed to determine distances between the vehicle 100 reference point 150 and the objects 200a, 200b, 200c reference point 150. Additionally or alternatively, the computer 110 may be programmed to determine a speed $v_1$, $v_2$, $v_3$ and/or an acceleration $a_1$, $a_2$, $a_3$ of respective objects 200a, 200b, 200c based on data received from the vehicle 100 sensors 130 and/or data received via the V-to-V communication network. Yet further, additionally or alternatively, the computer 110 may be programmed to determine an amplitude and a direction of vehicle 100 speed and/or acceleration. In other words, the computer 110 may be programmed to determine a vector including an amplitude and/or a direction of the vehicle 100 speed and/or acceleration. For example, as shown in FIG. 2, the speed $v_2$ and the acceleration $a_2$ of the object 200b is directed toward the lane 210a, which may indicate an intended lane change of the object 200b.

A vehicle 100 lane change may cause a risk of collision with an object 200a, 200b, 200c. A risk of collision may for example result from (i) the object 200b and the vehicle 100 change to the lane 210a, (ii) an acceleration of the object 200c while the vehicle 100 changes to the lane 210c, etc. The risk as that term is used herein is a value, e.g., specified by a number, indicating a risk of collision with another object 200a, 200b, 200c. The risk may be defined as numerical percentage value between 0% and 100%. In another example, the risk may be assigned to one of a plurality of discrete categories, such as "low", "medium", and "high" risk.

FIGS. 3A-3B show example hybrid images 300a, 300b including augmented images 320a, 320b outputted by the vehicle 100 HMI 140. With reference to FIG. 3A, the computer 110 may be programmed to output the image 300a including the object representations 310a, 310b, 310c of the objects 200a, 200b, 200. The computer 110 may be programmed to select the object 200a based on the risk posed by each of the detected objects 200a, 200b, 200c, to generate an augmented image 320a, and to superimpose the generated image 320a on the object representation 310a of the object 200a. Thus, the computer 110 may be programmed to generate a hybrid image (i.e., an augmented realty) including captured images of an area around the vehicle 100, e.g., an area behind the vehicle where the objects 200a, 200b, 200c are located, and generated images, e.g., the image 320a. Further below with reference to the graphs of FIG. 6 and Tables 1-3, it is discussed how the computer 110 may be programmed to determine the risk and to select one or more objects 200a, 200b, 200c for augmented realty, i.e., to be superimposed by a generated image. An object representation 310a, 310b, 310c, in the present context, is a representation of an object 200a, 200b, 200c in an image 300a, 300b, i.e., an object representation 310 typically includes a subset of pixels in an image 300 that includes the object representation.

The augmented image 320a may include a triangle (see FIG. 3A) and/or a shape, a shade, an illumination pattern, background pattern, a transparent watermark image, etc. The augmented images have one or more colors. Additionally or alternatively, as shown in FIG. 3B, the augmented image may be modified image of the selected object 200a, 200b, 200c. For example, the computer 110 may be programmed to determine a risk posed by the detected object 200c and to adjust the dimensions of the detected object 200a, 200b, 200c in the augmented image based at least in part on the determined risk. In other words, the augmented image may include an adjusted image of the selected object 200a, 200b, 200c. FIG. 3B shows an example augmented image 320b which is an "oversized" image of the object 200b. The computer 110 may be programmed to adjust (e.g., increase) the dimensions $d_4$, $d_5$ (see FIG. 3A) of the object 200b by changing them to adjusted dimensions $d_6$, $d_7$. In one example, the computer 110 may be programmed to change the dimensions $d_4$, $d_5$ to the dimensions $d_6$, $d_7$. The computer 110 may adjust the dimensions of the selected object 200b based on the determined risk as discussed below with reference to Tables 1-3. In one example, the dimensions $d_6$, $d_7$ of the augmented image 320b may be adjusted in proportion to the determined risk posed by the object 200b. The computer 110 may be programmed to start increasing the dimensions $d_6$, $d_7$ upon determining that the risk associated with the object 200b exceeds a threshold, e.g., 50%, and to increase the dimensions $d_6$, $d_7$ in proportion to an increase of the risk. In one example, the dimensions $d_6$, $d_7$ may be increased up to a factor of two of dimensions $d_4$, $d_5$.

Figure 4:
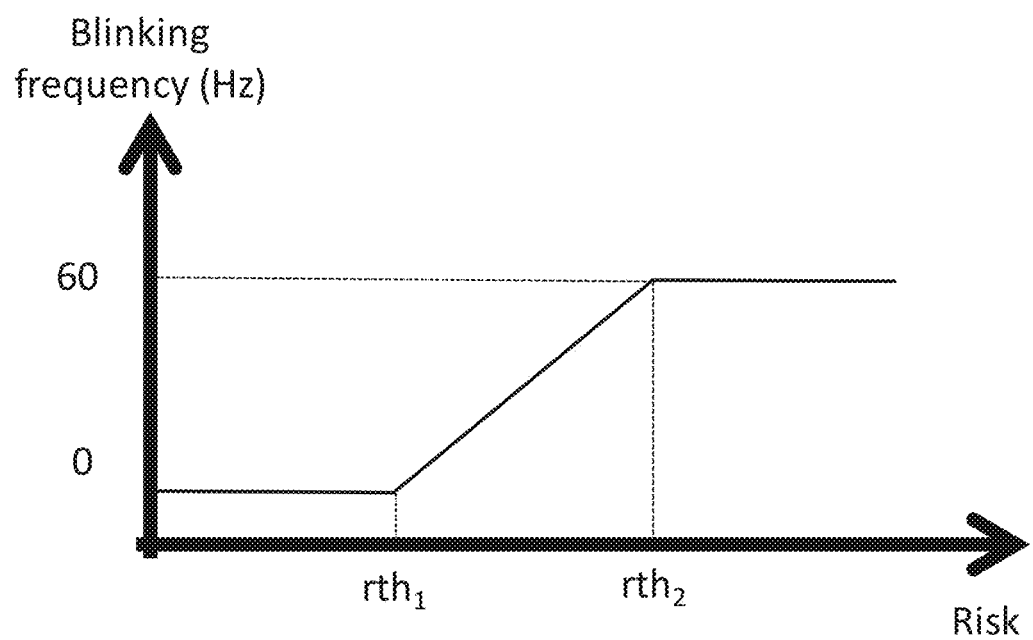
FIG. 4 shows an exemplary graph of blinking frequency of the augmented image.

The computer 110 may be programmed to determine a risk posed by the detected object 200a, 200b, 200c and to adjust the motion of the augmented image 320a, 320b of the detected object 200a, 200b, 200c by blinking the image 320a, 320b at a frequency. The frequency may be determined based on the determined risk. A "motion" of the augmented image 320a, 320b, in the present context, includes a blinking and/or any repetitive visual effect of the augmented image 320a, 320b. FIG. 4 shows an example graph of the blinking frequency based on the determined risk. The computer 110 may be programmed to determine the blinking frequency based on the graph and the determined risk, and to blink based on the determined frequency. "Blinking," in the present context, means changing between a superimposed and an eliminated state for the augmented image 320a, 320b. In one example, shown in operation (1), the computer 110 may be programmed to superimpose the generated image permanently (i.e., no blinking) when the determined risk is less than a first risk threshold $rth_1$, e.g., 50%, and to blink the augmented image 320a, 320b with an example maximum frequency, e.g., 60 Hz (Hertz), upon determining that the risk exceeds a second risk threshold $rth_2$.

$$freq = \begin{cases} 0, \text{ if risk} \leq rth_1 \\ 60, \text{ if risk} > rth_2 \\ 60 * \frac{risk - rth_1}{rth_2 - rth_1}, \text{ if risk} > rth_1 \text{ and risk} \leq rth_2 \end{cases} \quad (1)$$

Figure 5:
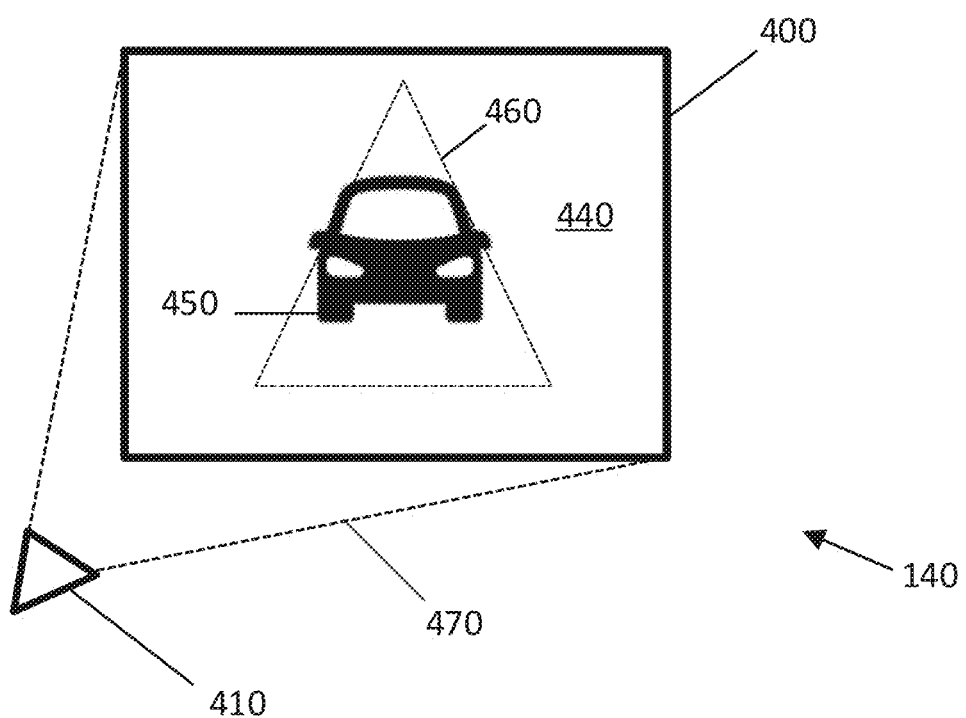
FIG. 5 shows a human machine interface of the vehicle of FIG. 1 including a mirror and an augmented image projected thereof.

As discussed above, the augmented image 320a, 320b may be included in a hybrid image outputted by the HMI 140 and/or projected over a captured real world image, e.g., a mirror. With reference to FIG. 5, the display device, e.g., the HMI 140, may include a mirror 400 with a reflective surface 440. The HMI 140 may further include a projector 410 with a field of projection 470 covering at least a portion of the mirror 400 reflective surface 440. The projector 410 may be mounted in front of (as shown in FIG. 5) or behind the mirror 400. The computer 110 may be programmed to project the augmented image 460 on the mirror 400. The augmented image 460 is superimposed on a reflected image 450 of a detected object 200a, 200b, 200c in the mirror 400. The computer 110 may be programmed to actuate a projector 410 to project the augmented image 460 on the reflected image 450.

The computer 110 may be programmed to identify a location of the reflected image 450 on the mirror 400 surface 440, e.g., based on data received from the vehicle 100 camera sensor 130, and to project the augmented image 460 at the identified location of the reflected image 450.

The computer 110 may be programmed to project the augmented image 460 based at least in part on a location and/or direction of the projector 410 relative to the mirror 400. Using geometrical techniques such as triangulation, the computer 110 may be programmed to actuate the projector 410 based on the location and/or direction of the projector 410 relative to the mirror 400 and the location of the reflected image 450 on the HMI 140.

The computer 110 may be programmed to identify the location, e.g., of a center point, of the reflected image 450 on the mirror 400, e.g., in units of pixels. The identified location of the reflected image 450 may be specified in a two-dimensional Cartesian coordinate system based on a reference point, e.g., a bottom left corner of the mirror 400. Further, the computer 110 may be programmed to store three-dimensional location coordinates of the projector 410 and the direction of the projector 410 in a computer 110 memory. Additionally or alternatively, the vehicle 100 may include a sensor 130, e.g., coupling the mirror 400 to a vehicle 100 body, that identifies an angle of the mirror 400 relative to the projector 410 and/or the vehicle 100 body. Thus, the computer 110 can be programmed to determine the angle (or orientation) of the projector 410 relative to the mirror 400 upon an adjustment of the mirror 400, e.g., by a vehicle 100 occupant.

As discussed above with reference to FIGS. 3A-3B, at least one of the dimensions and the motion of the augmented image 320a, 320b is adjusted based on a physical attribute of the detected object 200a, 200b, 200c including a speed, an acceleration, a location, and/or a direction of the detected object. In one example, the computer 110 may be programmed to determine the risk based on the physical attribute of the detected object and a risk classifier and to generate and/or adjust the augmented image 320a, 320b based at least in part on the determined risk posed by an object 200a, 200b, 200c. With reference to FIG. 6, the computer 110 may be programmed to determine the risk based example operations (2), (3), (4) which are visualized in example graphs 610, 620, 630 of FIG. 6. In other words, the risk classifiers may be the graphs 610, 620, 630. Additionally or alternatively, the risk classifiers may include mathematical operations, tables, etc. stored in a computer 110 memory. The computer 110 may be programmed to determine an acceleration risk aRisk, a speed risk vRisk, and a distance risk dRisk based on a distance d, a relative speed v, and a relative acceleration a (relative to a respective object 200a, 200b, 200c), and example thresholds as discussed below.

$$dRisk = \begin{cases} 0, \text{ if } d \leq dth_1 \\ 100\%, \text{ if } d > dth_2 \\ 100\% * \frac{d - dth_1}{dth_2 - dth_1}, \text{ if } d > dth_1 \text{ and } d \leq dth_2 \end{cases} \quad (2)$$

$$vRisk = \begin{cases} 100, \text{ if } v \leq vth_1 \\ 0, \text{ if } v > vth_2 \\ 100\% * \left(1 - \frac{v - vth_1}{vth_2 - vth_1}\right), \text{ if } v > vth_1 \text{ and } v \leq vth_2 \end{cases} \quad (3)$$

$$aRisk = \begin{cases} 0, & \text{if } a \leq ath_1 \\ 100\%, & \text{if } a > ath_2 \\ 100\% * \left(1 - \dfrac{a - ath_1}{ath_2 - ath_1}\right), & \text{if } a > ath_1 \text{ and } a \leq ath_2 \end{cases} \quad (4)$$

As shown in the exemplary graph 610 of FIG. 6, the computer 110 may be programmed to determine a distance risk dRisk (or a risk posed by a proximity) for each of the objects 200a, 200b, 200c. The computer 110 may be programmed to determine a distance risk dRisk of 100% upon determining that a distance $d_1$, $d_2$, $d_3$ to an object 200a, 200b, 200c is less than a first distance threshold $dth_1$, e.g., 20 meters. The computer 110 may be programmed to determine an absence of a distance risk dRisk upon determining that the distance $d_1$, $d_2$, $d_3$ to an object 200a, 200b, 200c is greater than a second distance threshold $dth_2$, e.g., 75 meters.

As shown in the exemplary graph 620 of FIG. 6, the computer 110 may be programmed to determine a speed risk vRisk (or a risk posed by a relative speed) for each of the objects 200a, 200b, 200c. The computer 110 may be programmed to determine a speed risk vRisk of 100% upon determining that a relative speed of the vehicle 100 to an object 200a, 200b, 200c is less than a first speed threshold $vth_1$, e.g., 5 kilometer per hour (kph). The relative speed may be specified with a positive numeric value when a distance $d_1$, $d_2$, $d_3$ of the vehicle 100 to the object 200a, 200b, 200c increases and a negative numeric number when the distance $d_1$, $d_2$, $d_3$ decreases, i.e., the vehicle 100 and the respective object 200a, 200b, 200c are approaching one another. Thus, the first speed threshold $vth_1$ may be alternatively a negative number, e.g., −5 kph. The computer 110 may be programmed to determine an absence of a speed risk vRisk posed by on object 200a, 200b, 200c upon determining that the relative speed of the vehicle 100 to the respective object 200a, 200b, 200c is greater than a second speed threshold $vth_2$, e.g., 10 kph.

As shown in the exemplary graph 630 of FIG. 6, the computer 110 may be programmed to determine an acceleration risk aRisk (or a risk posed by a relative acceleration) for each of the objects 200a, 200b, 200c. The computer 110 may be programmed to determine an acceleration risk aRisk of 100% upon determining that a relative acceleration of the vehicle 100 to an object 200a, 200b, 200c is less than a first acceleration threshold $ath_1$, e.g., 0.1 meter per square second (m/s²). The relative acceleration may be specified with a positive numeric value when a relative speed of the vehicle 100 to the object 200a, 200b, 200c increases and a negative numeric number when the relative speed of the vehicle 100 to the object 200a, 200b, 200c reduces. Thus, the first acceleration threshold $ath_1$ may be alternatively a negative number, e.g., −0.2 m/s². The computer 110 may be programmed to determine an absence of an acceleration risk upon determining that the relative acceleration of the vehicle 100 to an object 200a, 200b, 200c is greater than a second acceleration threshold $ath_2$, e.g., 0.3 m/s₂.

The computer 110 may be programmed to determine the risk posed by an object 200a, 200b, 200c based on the determined distance risk, acceleration risk, and/or speed risk. For example, the computer 110 may be programmed to determine the risk based on operation (5). As the operation (2) shows, the computer 110 may be programmed to determine a minimum of 100% and a sum of the determined distance risk dRisk, speed risk vRisk, and acceleration risk aRisk posed by an object 200a, 200b, 200c.

$$\text{risk} = \min\{d\text{Risk} + v\text{Risk} + a\text{Risk}, 100\%\} \quad (5)$$

The computer 110 may be programmed to output the augmented image 320a, 320b based on the determined risk. In one example, the computer 110 may be programmed to select one or more objects 200a, 200b, 200c upon determining that a risk posed by the respective object 200a, 200b, 200c exceeds a predetermined risk threshold, e.g., 50%, and to output one or more augmented images 320a, 320b based on the selected objects 200a, 200b, 200c. For example, with reference to FIGS. 2 and 3A, the computer 110 may be programmed to select the object 200a upon determining that the risk posed by the object 200a exceeds the risk threshold, and to output the augmented image 320a that is superimposed on the object representation 310a in an image 300 of the selected object 200a. Additionally or alternatively, with reference to FIGS. 2 and 3B, the computer 110 may be programmed to adjust on or more dimensions of the augmented image 320b based on the determined risk posed by the object 200b, as discussed above.

Additionally or alternatively, as discussed with reference to FIGS. 3A-3B, the computer 110 may be programmed to adjust a motion of the augmented image 460 based on the determined risk. For example, the computer 110 may be programmed to adjust a blinking frequency of the augmented image 460 based on the determined risk.

As discussed above, at least one of dimensions and a motion of the augmented image is adjusted based on an environmental condition. The computer 110 may be programmed to determine a multiplier factor based on the environmental condition, to determine a compensated risk based on the determined multiplier factor and the determined risk, and to adjust the dimensions of the image of the detected object based on the compensated risk.

TABLE 1

| Road type | First multiplier factor ($amp_1$) |
|---|---|
| Neighborhood | 1.0 |
| Local road | 1.0 |
| Interchange | 1.3 |
| Rural Freeway | 1.2 |
| City freeway | 1.3 |
| Highway | 1.2 |

With reference to Table 1, which provides example multiplier factors, the computer 110 may be programmed to determine a first multiplier factor $amp_1$ based on the road type where the vehicle 100 is located. For example, the computer 110 may be programmed to determine the first multiplier factor $amp_1$ of 1.3 upon determining that the vehicle 100 is moving on a city freeway. The computer 110 may be programmed to determine the road type based on data received from a vehicle 100 GPS (general positioning system) sensor 130, a vehicle 100 camera sensor 130, etc.

TABLE 2

| Traffic density | Second multiplier factor ($amp_2$) |
|---|---|
| Low | 1.0 |
| Medium | 1.2 |
| High | 1.4 |

With reference to Table 2, which provides example multiplier factors, the computer 110 may be programmed to determine a second multiplier factor $amp_2$ based on the traffic density where the vehicle 100 is located. For example, the computer 110 may be programmed to determine the second multiplier factor $amp_2$ of 1.4 upon determining that the vehicle 100 is moving in a high traffic density area. The computer 110 may be programmed to determine the road type based on data received from the vehicle 100 sensors 130, V-to-V communication network, etc. A traffic density, in the present context, is a number of objects 200a, 200b, 200c in a predetermined proximity (e.g., 250 meters) of the vehicle 100.

TABLE 3

| Visibility | Third multiplier factor ($amp_3$) |
|---|---|
| Low visibility | 1.4 |
| Medium visibility | 1.2 |
| Normal visibility | 1.0 |

With reference to Table 3, which provides example multiplier factors, the computer 110 may be programmed to determine a third multiplier factor $amp_3$ based on the visibility where the vehicle 100 is located. The visibility, in the present context, is a range from the vehicle 100 in which objects 200a, 200b, 200c can be detected, e.g., by a vehicle 100 sensor 130. For example, the ranges of "less than 100 meters", "between 100 and 400 meters", and "greater than 400 meters" may be associated with "low", "medium", and "high" visibility. For example, the computer 110 may be programmed to determine the third multiplier factor $amp_3$ of 1.2 upon determining that the vehicle 100 is moving in an area with a "medium" visibility. The computer 110 may be programmed to determine the visibility based on data received via the V-to-V communication network, the vehicle 100 sensor(s) 130, etc.

The computer 110 may be programmed to determine a multiplier factor based on the determined first, second, and third multiplier factors $amp_1$, $amp_2$, $amp_3$. In one example, the computer 110 may be programmed to determine the multiplier factor amp based on operation (6). As the operation (6) shows, the computer 110 may be programmed to determine the multiplier factor amp by identifying a maximum of the first, second, and third multiplier factors $amp_1$, $amp_2$, $amp_3$.

$$amp = \max(amp_1, amp_2, amp_3) \quad (6)$$

The computer 110 may be programmed to determine the compensated risk based on the determined risk and the determined multiplier factor amp. The computer 110 may be programmed to generate and/or adjust the augmented images based on the determined compensated risk. For example, the computer 110 may be programmed to adjust dimensions $d_6$, $d_7$ of the augmented image 450 and/or the blinking frequency of the augmented image 450 based on the compensated risk. The computer 110 may be programmed to select a type of the augmented image based on the determined compensated risk. For example, the computer 110 may be programmed to generate a triangular shaped augmented image 320a upon determining that the compensated risk exceeds 80%. With reference to FIG. 5, the computer 110 may be programmed to adjust dimensions of an image 450 of an object 200b upon determining that the compensate risk of the object is between 50% and 80%. In other words, the computer 110 may be programmed to generate augmented images 320a, 320b with different shapes, shades, colors, illumination, etc. that are selected and/or adjusted based on the compensated risk posed by a respective object 00a, 200b, 200c.

Processing

Figure 7A:
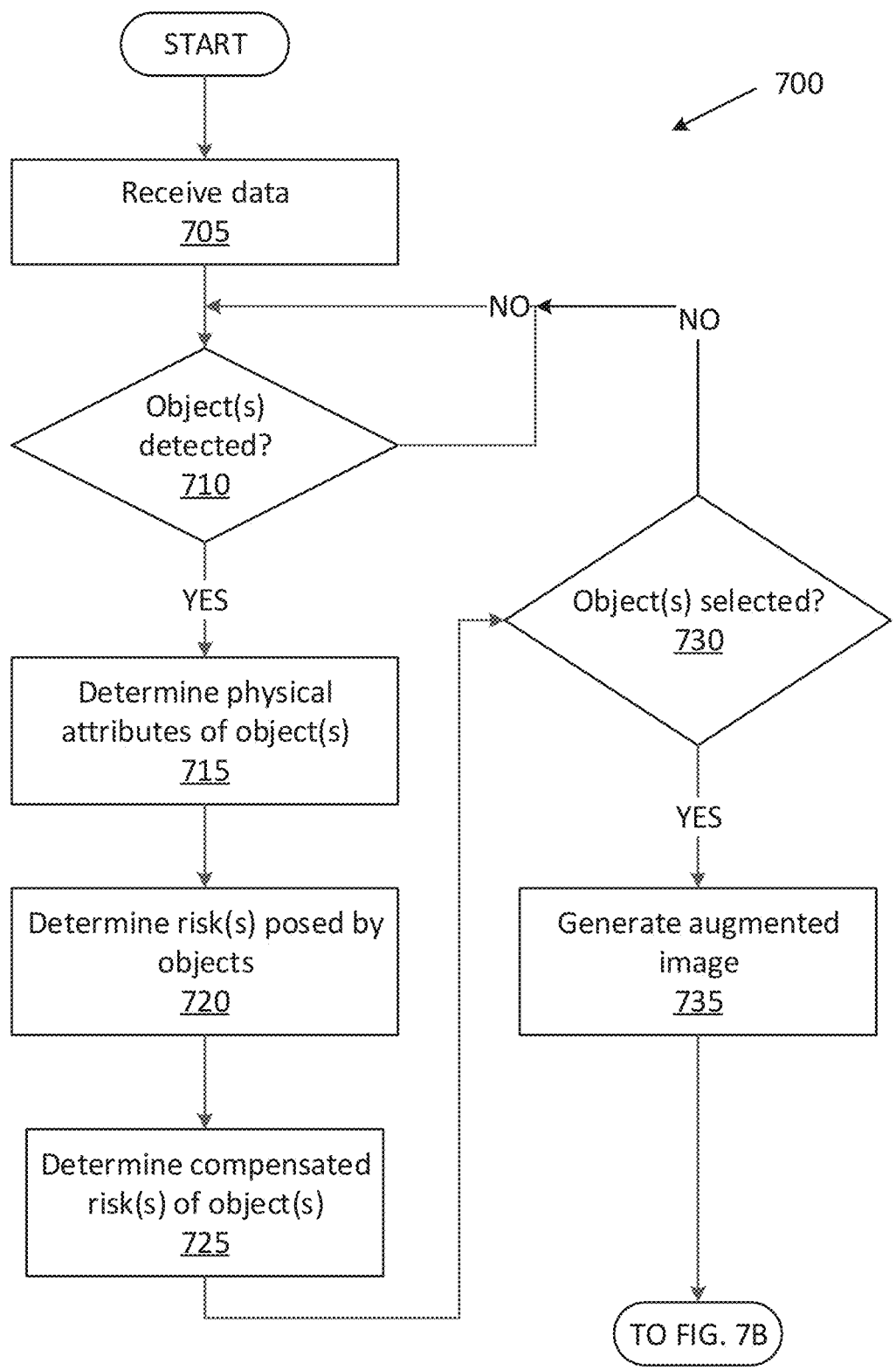
FIGS. 7A-7B are a flowchart of an exemplary process for generating augmented realty.
Figure 7B:
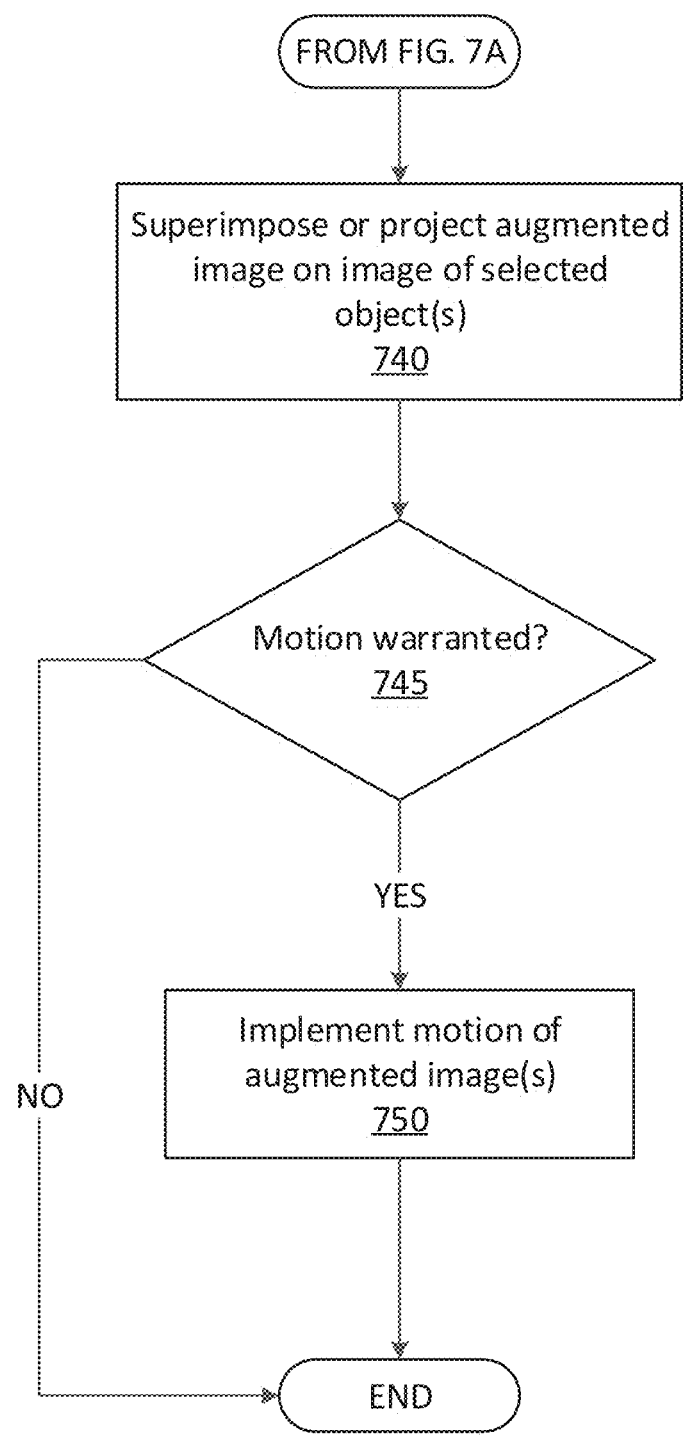

FIGS. 7A-7B accumulatively illustrate a flowchart of an exemplary process 700 for generating augmented realty. The vehicle 100 computer 110 may be programmed to execute blocks of the process 700.

With reference to FIG. 7A, the process 700 begins in a block 705, in which the computer 110 receives data, e.g., sensor 130 data, environmental condition, etc.

Next, in a decision block 710, the computer 110 determines whether an object 200a, 200b, 200c is detected. If the computer 110 detects an object 200a, 200b, 200c, the process 700 proceeds to a block 715; otherwise the process 700 returns to the decision block 710.

In the block 715, the computer 110 determines physical attributes of the detected object 200a, 200b, 200c. The computer 110 may be programmed to determine a distance d, a speed v, an acceleration a of the detected object 200a, 200b, 200c relative to the vehicle 100 location, speed, and acceleration. Additionally or alternatively, the computer 110 may be programmed to identify dimensions of the detected object 200a, 200b, 200c.

Next, in a block 720, the computer 110 determines a respective risk posed by each of the detected object(s) 200a, 200b, 200c. The computer 110 may be programmed to, first, determine a distance risk dRisk, a speed risk vRisk, and/or an acceleration risk aRisk posed by each of the detected objects 200a, 200b, 200c, and then to determine an overall or aggregate risk posed by each of the respective object(s) 200a, 200b, 200c based on the determined distance risk dRisk, speed risk vRisk, and/or acceleration risk aRisk.

Next, in a block 725, the computer 110 determines a compensated risk posed by each of the detected object(s) 200a, 200b, 200c. The computer 110 may be programmed to determine multiplier factors $amp_1$, $amp_2$, $amp_3$ based on the received environmental condition, and to determine the compensated risk posed by each of the object(s) 200a, 200b, 200c based on the determined multiplier factors $amp_1$, $amp_2$, $amp_3$ and the determined risk posed by each of the object(s) 200a, 200b, 200c.

Next, in a decision block 730, the computer 110 determines whether to select one or more of the detected objects 200a, 200b, 200c for generating augmented realty. The computer 110 may be programmed to select an object 200a, 200b, 200c for augmented realty upon determining that the determined compensated risk posed by the respective object 200a, 200b, 200c exceeds a threshold, e.g., 50%. If the computer 110 determines that at least an object 200a, 200b, 200c is selected, then the process 700 proceeds to a block 735; otherwise the process 700 returns to the decision block 710.

In the block 735, the computer 110 generates an augmented image 320a, 320b associated with each of the selected object(s) 200a 200b, 200c. The computer 110 may be programmed to determine a type, a dimension, etc. of the augmented image 320a, 320b based on the determined compensated risk, etc. posed by the object 200a, 200b, 200c.

Following the block 735, the process 700 proceeds to a block 740, as shown in FIG. 7B. In the block 740, the computer 110 superimposes and/or projects the augmented images 320a, 320b on the object representations 310a, 310b, 310c of the objects 200a, 200b, 200c. In one example, the computer 110 superimposes the augmented images 320a, 320b in the image 300a, 300b outputted by the HMI 140. In another example, the computer 110 projects the augmented images 320*a*, 320*b* on the reflective surface 440 of the HMI 140 mirror 400.

Next, in a decision block 745, the computer 110 determines whether motion of augmented image 450 is warranted. The computer 110 may be programmed to determine whether to generate a visual motion, e.g., blinking, for one or more of the augmented images 450. In one example, the computer 110 may be programmed to implement a motion of an augmented image 450 upon determining that the risk (or compensated risk) posed by the object 200*a*, 200*b*, 200*c* associated with the augmented image 450 exceeds a predetermined threshold $rth_2$. If the computer 110 implements motion for one or more augmented images 450, then the process 700 proceeds to a block 750; otherwise the process 700 ends, or alternatively, returns to the block 705, although not shown in FIGS. 7A-7B.

In a block 750, the computer 110 implements the motion as determined in the block 745 for the augmented image 450. The computer 110 may be programmed to determine a blinking frequency freq based on the determined risk posed by the object 200*a*, 200*b*, 200*c*, and to generate blinking of the augmented image 450 based on the determined frequency.

Following the block 750, the process 700 ends, or alternatively, returns to the block 705, although not shown in FIGS. 7A-7B.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
   detecting an object exterior to a vehicle;
   outputting an augmented image of the detected object to a vehicle display device, wherein at least one of dimensions and a motion of the augmented image is adjusted based on an environmental condition and physical attribute of the detected object including at least one of a speed, an acceleration, a location, and a direction of the detected object;
   determining a risk of collision posed by the detected object based on a speed, an acceleration, a time to collision, a distance of the object, and a plurality of risk classifiers, wherein the risk classifiers include graphs specifying respective distance, speed, and acceleration risks;
   determining a compensated risk of collision based on a plurality of multiplier factors and the determined risk, each of the multiplier factors corresponding to a different environmental condition in a plurality of environmental conditions; and
   adjusting the dimensions of the image of the detected object based on the compensated risk of collision.

2. The method of claim 1, wherein the environmental condition includes at least one of traffic density, a road type, and a visibility.

3. The method of claim 1, wherein the display device includes a vehicle mirror, the method further comprising projecting the augmented image on the vehicle mirror, wherein the augmented image is superimposed on a reflected image of the detected object in the mirror.

4. The method of claim 1, further comprising determining the risk based on the physical attribute of the detected object and a risk classifier.

5. The method of claim 1, further comprising adjusting the motion of the image of the detected object by blinking the image at a frequency, wherein the frequency is based on the determined risk.

6. A system, comprising a processor and a memory, the memory storing instructions executable by the processor to:
   detect an object exterior to a vehicle;
   output an augmented image of the detected object to a vehicle display device, wherein at least one of dimensions and a motion of the augmented image is adjusted based on an environmental condition and physical attribute of the detected object including at least one of a speed, an acceleration, a location, and a direction of the detected object;

determine a risk of collision posed by the detected object based on a speed, an acceleration, a time to collision, a distance of the object, and a plurality of risk classifiers, wherein the risk classifiers include graphs specifying respective distance, speed, and acceleration risks;

determine a compensated risk of collision based on a plurality of multiplier factors and the determined risk, each of the multiplier factors corresponding to a different environmental condition in a plurality of environmental conditions; and adjust the dimensions of the image of the detected object based on the compensated risk of collision.

7. The system of claim 6, wherein the environmental condition includes at least one of traffic density, a road type, and a visibility.

8. The system of claim 6, wherein the display device includes a vehicle mirror, and the instructions include further instructions to project the augmented image on the vehicle mirror, wherein the augmented image is superimposed on a reflected image of the detected object in the mirror.

9. The system of claim 6, wherein the instructions include further instructions to determine the risk based on the physical attribute of the detected object and a risk classifier.

10. The system of claim 6, wherein the instructions include further instructions to adjust the motion of the image of the detected object by blinking the image at a frequency, wherein the frequency is based on the determined risk.

11. A system, comprising:

means for detecting an object exterior to a vehicle;

means for outputting an augmented image of the detected object to a vehicle display device, wherein at least one of dimensions and a motion of the augmented image is adjusted based on an environmental condition and physical attribute of the detected object including at least one of a speed, an acceleration, a location, and a direction of the detected object;

means for determining a risk of collision posed by the detected object based on a speed, an acceleration, a time to collision, a distance of the object, and a plurality of risk classifiers, wherein the risk classifiers include graphs specifying respective distance, speed, and acceleration risks;

means for determining a compensated risk of collision based on a plurality of multiplier factors and the determined risk, each of the multiplier factors corresponding to a different environmental condition in a plurality of environmental conditions; and means for adjusting the dimensions of the image of the detected object based on the compensated risk of collision.

* * * * *